3,491,041
MODIFIED FURFURYL ALCOHOL COATING RESIN

Ralph W. Dornte, Langhorne, Pa., assignor, by mesne assignments, to ESB Incorporated, Philadelphia, Pa., a corporation of Delaware
No Drawing. Filed Oct. 25, 1966, Ser. No. 594,966
Int. Cl. C08f 5/04, 17/00
U.S. Cl. 260—18                                     15 Claims

ABSTRACT OF THE DISCLOSURE

This invention relates to a modified furfuryl alcohol resin which is prepared by reacting furfuryl alcohol and an epoxy compound to form a soluble resin which can be subsequently cured to a hard, corrosion resistant, thermoset coating. One of the problems often encountered when polymerizing or copolymerizing furfuryl alcohol is that it readily crosslinks to form a thermoset material which is not useful as a coating resin. It has been discovered that from about 3 to about 20 parts by weight of furfuryl alcohol can be reacted with 1 part by weight of an epoxy compound in the presence of a Friedel-Crafts catalyst to yield a soluble resin, provided that the reaction temperature is maintained at less than about 100° C.

---

It is well known that furfuryl alcohol is highly reactive due to its plurality of active sites and that it is readily polymerized. In fact, the polymerization of furfuryl alcohol is an exothermic reaction and is difficult to control. One of the problems encountered in preparing coating resins from furfuryl alcohol is that it readily crosslinks during polymerization to form a thermoset material which is not useful as a coating resin because it is cured or crosslinked before it can be applied to the surface to be coated. Furthermore, furfuryl alcohol resins are generally brittle and do not have good bonding or adhesive properties.

Attempts to overcome these disadvantages by mixing the furfuryl alcohol resins with other resins have not been satisfactory. For example, the addition of polyvinyl chloride or polyvinyl acetate to furane resin coating lacquers has been tried but has not been totally successful. These resin addittives have reduced the brittleness and have improved the bonding properties of the furane resin coatings, but unfortunately, they have also reduced the corrosion resistance.

It is an object of this invention to provide a soluble, modified furfuryl alcohol coating resin having corrosion resistance, good adhesion and flexibility.

Another object of the invention is to provide a method for preparing a modified furfuryl alcohol resin which is soluble and which can be subsequently cured to a hard, thermoset resin.

A further object of the invention is to provide a coating composition comprising a soluble, modified furfuryl alcohol resin and a solvent for said resin.

Other objects and advantages of this invention may be determined from the description and the examples which follow.

It has been discovered that a modified furfuryl alcohol coating resin can be prepared by reacting furfuryl alcohol with an epoxy compound which may be either a low molecular weight compound (propylene oxide) or a high molecular weight compound (epoxy resin). The epoxy compound may contain one or more epoxy or oxirane groups which may be designated in formula form as follows:

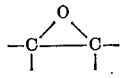

Since it is an object of this invention to retain the good corrosion resistance of the furfuryl alcohol resin, only minor proportions of the epoxy compound are reacted with the furfuryl alcohol. In general, it is preferred to react from about 3 to about 20 parts by weight of furfuryl alcohol per part of epoxy compound, though the optimum reactant amount will vary depending on the reactants, the reaction conditions, and the properties desired in the reaction product.

As previously indicated, the epoxy compound which is reacted with furfuryl alcohol may contain one or more oxirane groups. Examples of epoxy compounds which have been reacted with furfuryl alcohol and have formed satisfactory coating resins are epichlorohydrin, propylene oxide, glycidol, styrene oxide, phenyl glycidyl ether, vinylcyclohexene oxide, vinylcyclohexene dioxide, dipentene dioxide, resorcinol diglycidyl ether, silicone epoxide, soybean oil epoxide and various epoxy resins. All of these epoxy compounds were reacted with furfuryl alcohol in various proportions to form soluble resins which were subsequently cured to form hard, thermoset coatings having good corrosion resistance.

One of the difficulties encountered in carrying out these reactions is the tendency to form an insoluble resin product which has been crosslinked into a thermoset resin. This problem is particularly troublesome when reacting diepoxides or other epoxy compounds having a plurality of oxirane groups. The tendency to crosslink may be minimized by using a high weight ratio of furfuryl alcohol to epoxy compound and by maintaining the reaction temperatures as low as possible while still having a practicable reaction rate.

In general, the furfuryl alcohol-epoxy compound reaction can be catalyzed by conventional Friedel-Crafts type catalysts such as ferric chloride, aluminum chloride, boron trifluoride, etc. Boron trifluoride ($BF_3$) complexes were found to be particularly active, with the etherate activity proving to be greater than the phenol complex. The preferred catalyst for carrying out the furfuryl alcohol-epoxy compound reaction is boron trifluoride ethyl etherate ($BF_3 \cdot C_2H_2OC_2H_5$).

The furfuryl alcohol-epoxy compound reaction has been carried out in various solvent media, including toluene, xylene, methyl butyl ketone, methyl isobutyl ketone and combinations of these. One of the functions of the solvent media is to retard the formation of insoluble resins, and it has been found that the ketones are quite helpful in this respect. Another factor favoring the use of ketones is that they can be used as the carrier or solvent for the furfuryl alcohol-epoxy compound coating resin. Since it is desirable to have a minimum water content in the coating resin lacquer, it may be necessary to have a dehydration treatment to remove the water formed during the furfuryl alcohol-epoxy resin reaction. When the preferred solvent, methyl isobutyl ketone, is used, the dehydration can be avoided by carrying out the reaction at the boiling point of the reaction mixture if it is sufficiently low to avoid formation of a substantial amount of insoluble resin. If dehydration of the reaction product is necessary, it is readily carried out by distilling of the solvent-water azeotrope, e.g. methyl isobutyl ketone-water azeotrope (25 wt. percent $H_2O$) has a boiling point of 87° C.

Control of the reaction temperature is a critical factor in carrying out the furfuryl alcohol-epoxy compound reaction. It is essential that the temperature be maintained at less than about 100° C. even though this is difficult because of the exothermic nature of the reaction, for otherwise, reaction temperatures exceeding 100° C. will produce an excessive amount of insoluble resin. It is preferred to maintain the reaction temperature between about 60° C. and about 80° C., and this is accomplished by terminating the reaction at a conversion between 60–70%. The reaction may be terminated by adding an excess of saturated sodium carbonate solution to the reaction mass.

The furfuryl alcohol-epoxy compound reaction product, which is the desired product of this invention, is a soluble resin which can be cured to a hard, thermoset, corrosion resistant coating. These soluble resins are dissolved in a common coating solvent, e.g. ketones such as methyl isobutyl ketone or esters such as ethyl acetate, to form coating lacquers. At the time the coating lacquer is to be applied, a Friedel-Crafts catalyst such as boron trifluoride is incorporated into the lacquer to aid in curing the furfuryl alcohol-epoxy compound resin into a hard, thermoset coating. It is preferred that the modified furfuryl alcohol resin in the form of a coating lacquer be capable of air drying to an insoluble, hard, thermoset resin coating within about 16 hours at room temperature. Of course, the curing of the coating lacquer can be accelerated by applying heat.

The following examples illustrate the preparation of soluble, modified furfuryl alcohol resins in accordance with this invention, and the advantages provided by such resins when used to form protective coatings.

Example I

The following formulation was used to prepare a furfuryl alcohol-epichlorohydrin coating resin:

| Ingredient: | Amount (g.) |
|---|---|
| Furfuryl alcohol (FA) | 180 |
| Epichlorohydrin (ECH) | 20 |
| Methyl isobutyl ketone (MIBK) | 250 |
| Boron trifluoride catalyst solution (BF$_3$ 1 wt. percent in MIBK) (100 ml.) | 80 |

The catalyst solution was prepared by dissolving $$BF_3 \cdot C_2H_5OC_2H_5$$

in MIBK to form a solution containing 1% by weight of BF$_3$ in MIBK.

The FA, ECH and MIBK ingredients were weighed into a 1.5 liter glass resin kettle and were agitated. The kettle was equipped with 4 openings in the top for a motor driven stirrer, a thermometer, a sampling port and a fractionating column. The fractionating column was ¾ inch inside diameter by 6 inches in length and was packed with ⅛ inch glass helices. The reaction temperature was maintained, when necessary, by an electric heating mantle on the kettle connected through a Variac. After the feed was thoroughly stirred, the catalyst solution was added incrementally in 1–10 ml. portions from a burette. Temperature control was used to determine the amount and when catalyst was to be added as the reaction progressed, being careful that the temperature rise did not exceed 1° C. per minute. The heat of reaction was used to heat the reactants to 60° C. where the reaction mass was maintained, cooling or heating as necessary.

In order to determine the extent of the reaction, 0.5 g. samples were taken from the reactor at 15 minute intervals, cooled to room temperature, weighed into an aluminum paint dish, and deactivated by adding 1 drop of NH$_3$ solution (29 wt. percent NH$_3$). Then the sample was heated to 110° C. to evaporate the MIBK and was maintained at 110° C. for 10 minutes to obtain resin solids content and thereby the extent of conversion.

When the conversion reached 60–70%, 10 g. of 30 wt. percent Na$_2$CO$_3$ solution was added to the reaction mass to deactivate the BF$_3$ catalyst. Then the kettle was heated to 105° C. to remove the water formed during the reaction and which had been converted to a

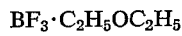
MIBK-H$_2$O azeotrope (25 wt. percent H$_2$O) having a boiling point of 87.5° C. After the overhead temperature reached 95° C. (kettle temperature 120° C.), the product was cooled to 60° C. and filtered through a Buchner funnel containing filter paper pre-coated with 15 g. of filter aid (Celite HSC). After filtration, the coating resin solution had a solids content of 30 wt. percent. In this example, the reaction temperature ranged from 28° to 60° C., and the total reaction time was 2.8 hours. 0.4 wt. percent of BF$_3$ catalyst based on FA+ECH was used, and there was a 64% conversion.

The final coating resin solution (30 wt. percent solids) was evaluated on a tinplated steel panel by adding additional catalyst solution (1 wt. percent BF$_3$ as

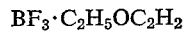
$$BF_3 \cdot C_2H_5OC_2H_2$$

in MIBK). The addition of 1.3 wt. percent BF$_3$ based on resin solids gave the following results on a test panel to which a 1–3 mil film had been applied by painting.

| | Air Dry Test | Baked Film (10 min. at 110° C.) |
|---|---|---|
| Drying time | 5 hr's | |
| Hardness | Hard | Hard. |
| Mandrel | ⅛ inch | ¼ inch. |
| MEK effect | Slight attack | None. |

Drying time was taken as the time required for the film to become tack-free or dry to touch. The hardness test was based on the resistance of the film to scoring or cutting by a thumb nail: a soft film is cut through, a medium hardness is scored and a hard film is not scored. The flexibility or mandrel test was in accordance with ASTM Test D 1737–60T. A film which passes a ½ inch or less mandrel test has adequate flexibility for most protective coating applications. Solvent resistance was measured by rubbing the film with cotton saturated with methyl ethyl ketone (MEK). The MEK removes the film from poor cures, dulls the surface for intermediate cures, and has no effect for good cures.

It is apparent that the furfuryl alcohol-epichlorohydrin coating resin of this example yielded good test results.

Example II

Another furfuryl alcohol-epichlorohydrin coating resin was prepared in accordance with the procedures set forth in Example I. The following reaction conditions were used:

Feed FA:ECH:MIBK wt. ratio, 9:1:13.8
Reaction temperatures, °C., 26–80
Reaction time, hr., 4.5
Catalyst BF$_3$ wt. percent based on FA+ECH, 0.13
Conversion, percent, 72

This furfuryl alcohol-epichlorohydrin coating resin was coated onto a tin-plated steel panel, cured with a BF$_3$ catalyst (0.3 wt. percent based on resin solids) and evaluated for its protective coating properties in accordance with the tests described in Example I.

| | Air Dry Test | Baked film (10 min. at 110° C.) |
|---|---|---|
| Drying time | 2 hours | |
| Hardness | Medium | Medium. |
| Mandrel | ⅛ inch | ⅛ inch. |
| MEK effect | Slight attack | None. |

This resin was also evaluated for its corrosion resistance by applying 3 coats to a sandblasted, cylindrical, cold-rolled steel plummet (½ in. diameter x 2 in. length with rounded ends). Each coat involved 2 dips in the resin solution with partial drying between dips and 24 hours between each coat. The total coating thickness ranged from 2–3 mils. Four test specimens were prepared, with 2 being immersed at room temperature up to ½ of their length in 10 wt. percent HCl and the other 2 in 10 wt. percent NaOH. The specimens were immersed up to only ½ their length because the solution-air interface is often the place of the most severe attack. Both specimens remained in the HCl solution for more than 49 days before they were blistered, and the specimens in the NaOH went 20 days before forming blisters. The superior resistance to HCl was predictable because of the NaOH attack on the chlorine in the furfuryl alcohol-epichlorohydrin resin.

Example III

Furfuryl alcohol (FA)-propylene oxide (PO) coating resins were prepared in accordance with the procedures set forth in Example I, though several reaction conditions were changed because of the substitution of propylene oxide for the epichlorohydrin. In general, the reaction temperature was higher and the duration of the reaction was shorter. Three resins were prepared using the following reaction conditions:

|  | Feed FA:PO:MIBK, wt. ratio | Reaction Temperature, °C. | Reaction Time, hrs. | Catalyst BF₃, wt. percent based on FA plus PO | Conversion, percent |
|---|---|---|---|---|---|
| Resin A | 9:1:14.5 | 93 | 2.3 | 0.2 | 74 |
| Resin B | 9:1:15 | 80 | 1.8 | 0.4 | 75 |
| Resin C | 19:1:29 | 93 | 1.8 | 0.2 | 69 |

It should be noted that the reaction temperature in the preparation of resins A and C was allowed to rise to and was maintained at 93° C. which was the boiling point of the feed.

These resins were evaluated as coating resins using either BF₃ or phosphoric acid (H₃PO₄) as the curing catalyst. In general, greater amounts of phosphoric acid catalyst were required to cure these resins. The cured resins were also evaluated for their corrosion resistance in HCl and NaOH in accordance with the procedure described in Example II.

It should be noted that in the corrosion resistance test, the resin B films were baked at 110° C. for 15 minutes which appeared to improve their corrosion resistance. Furthermore, these resins have superior resistance to NaOH than the epichlorohydrin resins because there is no chlorine for the NaOH to attack.

Example IV

A variety of epoxy compounds were reacted with furfuryl alcohol in accordance with the procedures of Example I to determine their ability to form suitable coating resins. These resins were prepared using the following epoxy compounds (E) and reaction conditions:

| Epoxy Compd. (E) | Feed FA:E:MIBK, wt. ratio | Reaction Temp., °C. | Reaction Time, hrs. | Catalyst BF₃, wt. percent based on FA+E | Conversion percent | Resin Solids wt. percent |
|---|---|---|---|---|---|---|
| Glycidol | 19:1:20 | 70–80 | 4.0 | 0.14 | 64 | 46 |
| Styrene Oxide | 9:1:12 | 70 | 2.2 | 0.24 | 68 | 54 |
| Phenyl Glycidyl Ether | 9:1:12 | 70 | 2.8 | 0.20 | 64 | 40 |
| Vinylcyclohexene Oxide | 9:1:12 | 70 | 3.5 | 0.24 | 64 | 52 |
| Vinylcyclohexene Dioxide | 9:1:12 | 70 | 2.5 | 0.20 | 70 | 50 |
| Dipentene Dioxide | 9:1:14 | 70 | 2.3 | 0.24 | 68 | 38 |
| Resorcinol Diglycidyl Ether | 19:1:34 | 70 | 2.8 | 0.28 | 70 | 36 |
| Silicone Epoxide | 19:1:34 | 70–80 | 3.0 | 0.28 | 70 | 38 |
| Soybean Oil Epoxide | 19:1:28 | 70–80 | 2.8 | 0.24 | 67 | 46 |
| Epoxy Resin (Epon 828) | 4:1:8 | 70 | 1.7 | 0.24 | 69 | 34 |
| Epoxy Resin (Epon 871) | 19:1:35 | 70 | 3.3 | 0.24 | 72 | 38 |
| Epoxy Resin (DEN 438) | 4:1:8 | 70 | 1.7 | 0.28 | 74 | 40 |
| Epoxy Resin (DEN 438) | 19:1:30 | 70 | 2.3 | 0.24 | 71 | 34 |

After their preparation, the resins were evaluated for their coating properties in accordance with the procedures described in Example II. In these evaluations, the resin films were air dried unless otherwise indicated.

| Epoxy Compd. | Catalyst, wt. percent based on resin solids | Drying Time, hrs. | Hardness | Mandrel (in.) | MEK Effect | Corrosion Resistance 10% HCl Days | Corrosion Resistance 10% NaOH, Days |
|---|---|---|---|---|---|---|---|
| Glycidol | 0.5 BF₃ | 2 | Medium | ⅛ | Slight | 60+ | 35 |
| Styrene Oxide | 0.9 BF₃ | 0.5 | Hard | ½ | do | 15 | 7 |
| Phenyl Glycidyl Ether | 1.1 BF₃ | 1 | Medium | ½ | None | Not Tested | |
| Vinylcyclohexene Oxide | 1.2 BF₃ | 0.8 | do | ⅛ | Slight | 60 | 12 |
| Vinylcyclohexene Dioxide | 1.1 BF₃ | 1 | do | ⅜ | do | 60+ | 34 |
| Dipentene Dioxide | 1.1 BF₃ | 1 | do | ¾ | None | 60+ | 15 |
| Resorcinol Diglycidyl Ether | 1.1 BF₃ | 0.5 | Hard | ¼ | do | 60+ | 15 |
| Silicone Epoxide | 1.0 BF₃ | 0.5 | Medium | >1 | do | 60+ | 29 |
| Soybean Oil Epoxide | 6 H₃PO₄ | 1 | Hard | ¼ | do | 60+ | 60 |
| Epon 828 | 1.2 BF₃ | 1 | do | >1 | do | 60 | 12 |
| Epon 871 | 1.0 BF₃ | 1 | Medium | ⅛ | Slight | 60 | 40 |
| DEN 438 | 2.0 BF₃ | 10 | Hard | >1 | None | 60 | 29 |
| DEN 438 | 10 H₃PO₄ | 1.5 | do | ⅛ | do | 60 | 40 |

The Epon 871 resin which was tested for corrosion resistance was baked for 15 minutes at 110° C.

All of the epoxy compounds which were tested yielded soluble resins which could be used as protective coatings. Of course, reactant proportions and reaction conditions can be modified to provide resins having improved properties.

The epoxy resins tested in this example are all commercially available. The Epon 828 resin is a liquid, and

|  | Catalyst | Catalyst, wt. percent of Resin Solids | Air Dried Film | | | | Baked Film (10 min. at 110° C.) | | | | |
|---|---|---|---|---|---|---|---|---|---|---|---|
|  |  |  | Drying Time (hr.) | Hardness | Mandrel (in.) | MEK Effect | Hardness | Mandrel (in.) | MEK Effect | Corrosion Resistance 10% HCl, days | Corrosion Resistance 10% NaOH, days |
| Resin A | BF₃ / H₃PO₄ | 2.2 / 5.6 | 1 / 1 | H / M | ¾ / ½ | No effect / Slight effect | H / >1 | >1 / do | No effect / do | 60 / (¹) | 50 / — |
| Resin B | H₃PO₄ | 1.2 | 1 | M | >1 | Moderate effect | H | ½ | No effect | 60+ | 60+ |
| Resin C | BF₃ / H₃PO₄ | 1.2 / 5.0 | 0.5 / 1.5 | H / S | ⅜ / ⅛ | No effect / Slight effect | H / — | >1 / ¼ | No effect / do | 60 / (¹) | 50 / — |

¹ Not tested.

the chemical structure of a typical molecule of this resin may be represented as follows.

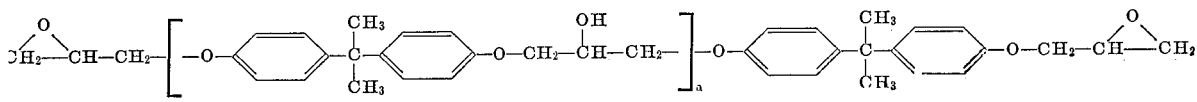

The Epon 828 resin has a viscosity at 25° C. ranging from about 100 to about 160 poises and an epoxide equivalent of 185–192. The Epon 871 is an aliphatic modification of the 828 resin, and it also is a liquid having a viscosity of 4–9 poises and an epoxide equivalent of 390–470. The DEN 438 resin can be represented by the following theoretical structure:

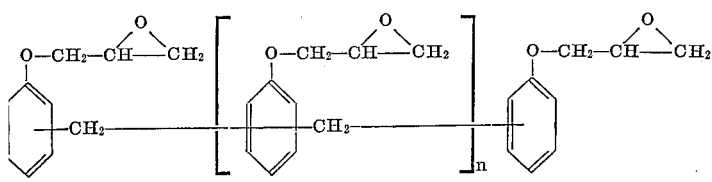

wherein $n$ has an average value of 1.6. This resin is a high viscosity liquid having a viscosity at 25° C. of about 19,000,000 centipoises and an epoxide equivalent of 175–182.

Having completely described this invention, what is claimed is:

1. A soluble modified furfuryl alcohol coating resin comprising a furfuryl alcohol-epoxy compound resin formed by reacting from about 3 to about 20 parts by weight of furfuryl alcohol with one part by weight of an epoxy compound containing at least one functional oxirane group, said reaction being carried out in a non-aqueous reaction mass at a temperature less than about 100° C. in the presence of a Friedel-Crafts catalyst and terminated before the reactants are completely converted to an insoluble thermoset resin, whereby said soluble modified furfuryl alcohol resin can be subsequently cured to a hard thermoset resin.

2. A modified furfuryl alcohol coating resin in accordance with claim 1 in which the epoxy compound is phenyl glycidyl ether.

3. A modified furfuryl alcohol coating resin in accordance with claim 1 in which the epoxy compound is a vinylcyclohexene oxide.

4. A modified furfuryl alcohol coating resin in accordance with claim 1 in which the epoxy compound is propylene oxide.

5. A modified furfuryl alcohol coating resin in accordance with claim 1 in which the epoxy compound is an epoxy resin.

6. A modified furfuryl alcohol coating resin in accordance with claim 1 in which the epoxy compound is soybean oil epoxide.

7. A method for preparing a soluble modified furfuryl alcohol coating resin which comprises reacting from about 3 to about 20 parts by weight of furfuryl alcohol with one part by weight of an epoxy compound containing at least one functional oxirane group, said reaction being carried out in a non-aqueous solvent for said furfuryl alcohol and epoxy compound, at a temperature less than about 100° C., in the presence of a Friedel-Crafts catalyst, and terminating said reaction before the reactants are completely converted to an insoluble thermoset resin.

8. A method in accordance with claim 7 in which the Friedel-Crafts catalyst is boron trifluoride.

9. A method in accordance with claim 8 in which the solvent is a ketone.

10. A method in accordance with claim 9 in which the reaction temperature is the boiling point of the furfuryl alcohol-epoxy compound-solvent feed.

11. A method in accordance with claim 7 in which the reaction mass, after termination of the reaction, is dehydrated to remove the water formed during the reaction.

12. A method in accordance with claim 7 in which no more than about 75% by weight of the reactants are converted to resin solids.

13. A method in accordance with claim 7 in which the reaction is terminated by adding an alkaline solution to the reaction mass.

14. A method in accordance with claim 7 in which the reaction is carried out at the boiling point of the reaction mixture to avoid hydrolysis of the reactants.

15. A curable, modified furfuryl alcohol coating composition comprising a ketonic solvent and a furfuryl alcohol-epoxy compound resin which is soluble in said solvent, said resin being prepared by reacting at a temperature less than about 100° C. from about 3 to about 20 parts by weight of furfuryl alcohol with one part by weight of an epoxy compound containing at least one functional oxirane group.

References Cited

UNITED STATES PATENTS

| 3,366,595 | 1/1968 | Dereich | 260—829 X |
| 3,301,918 | 1/1967 | Dereich | 260—829 |
| 3,268,466 | 8/1966 | Simm | 260—829 X |
| 3,091,533 | 5/1963 | Hodgins | 260—829 |

FOREIGN PATENTS

34/10,791  12/1959  Japan.

OTHER REFERENCES

Brown et al.: Modern Plastics, "Furfuryl Alcohol as a Resin Modifier," vol. 39, No. 4, 1961, pp. 135, 138, 140, 206.

Chemical Abstracts: vol. 61, 7200–01; vol. 54, 17970; vol. 53, 20906.

DONALD E. CZAJA, Primary Examiner

C. W. IVY, Assistant Examiner

U.S. Cl. X.R.

117—132; 260—2, 32.8, 33.6, 47, 88.3, 88.5, 829